April 18, 1961 J. PICKLES 2,980,163
ADJUSTABLE SEAT SUPPORT MECHANISM
Filed Dec. 15, 1958
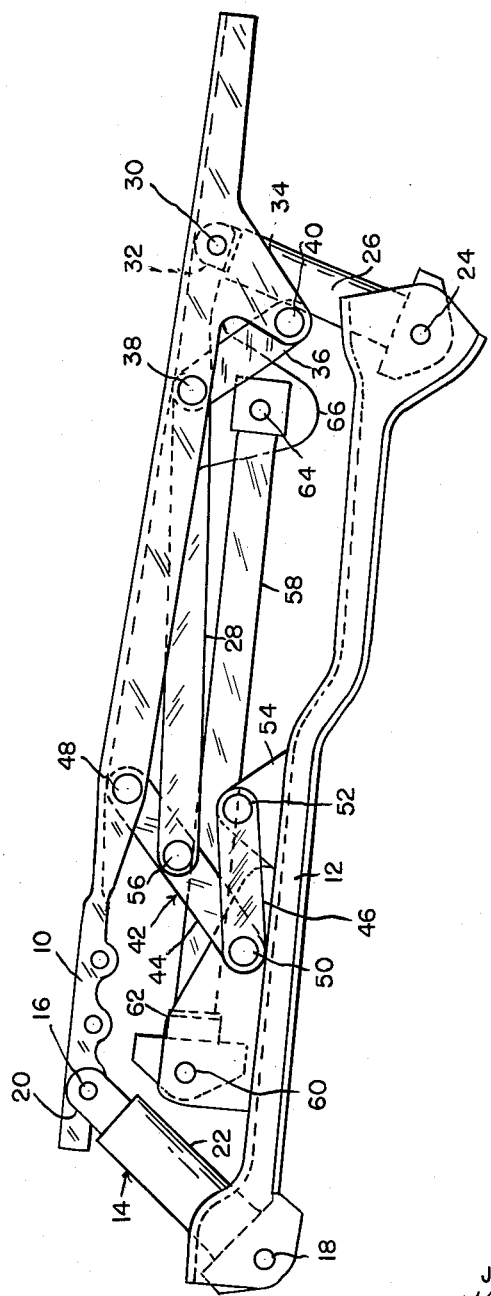
INVENTOR.
JOSEPH PICKLES
BY
ATTORNEYS United States Patent Office 2,980,163
Patented Apr. 18, 1961

2,980,163
ADJUSTABLE SEAT SUPPORT MECHANISM
Joseph Pickles, Dearborn, Mich., assignor to Ferro Stamping Company, Detroit, Mich., a corporation of Michigan Filed Dec. 15, 1958, Ser. No. 780,342
11 Claims. (Cl. 155—14)

The present invention relates to adjustable seat support mechanism and, more particularly, to adjustable seat support mechanism adapted for use in a motor vehicle. At the present time, vehicle seats are provided with support means which permits a variety of adjustments. The so-called "six-way" seat adjusters may be adjusted fore and aft, vertically and tilted.

In accordance with the present invention the fore and aft adjustment of the seat is accommodated by supporting seat support bars on generally vertically extending links which are pivoted to the bar and to the stationary frame. Inasmuch as these links each swing about a fixed pivot it will, of course, be apparent that the point on the seat support bar connected to the link pivots in an arcuate path. It will further be apparent that if both of the swinging links which supports the seat support bar extend upwardly from such pivots then fore and aft movement of the seat will be accompanied by a raising and lowering of the seat. This is particularly undesirable in present car constructions in which the top is lowered to a position such that vertical displacement of the driver results in impaired visibility.

In accordance with the present invention, the seat support links are so arranged that as one causes an edge of the seat to swing in an upwardly convex arc the other link causes the opposite edge of the seat to swing in an upwardly concave arc. This results in a seat motion in which fore and aft movement is accompanied by some tilting but an intermediate point on the seat moves substantially in a horizontal plane.

With the foregoing general remarks in mind, it is an object of the present invention to provide a seat support in which the seat or seat supporting bars are connected to links by means of which fore and aft movement of the seat is permitted and in which means is provided for effecting a tilting action of the seat in timed relation to fore and aft movement which will maintain the intermediate portion of the seat substantially at the same effective height.

More specifically, it is an object of the present invention to provide seat supporting linkage including a bar adapted to be connected to an end of a vehicle seat, support links for said bar, one of said links being adapted to pivot about a stationary axis below said bar and the other of said links being adapted to pivot about an axis above its point of connection to the bar so that an intermediate portion of the bar will remain substantially in a horizontal plane during fore and aft adjustment of the seat.

Still more specifically, it is an object of the present invention to provide seat support linkage comprising a stationary support bar, a seat support bar disposed above the stationary bar, an extensible link interconnecting adjacent ends of said bars, a second link pivoted to the other end of said stationary bar and linkage connecting the other end of said extensible link to the other end of said seat support bar and adapted to compensate for vertical movement of the first end of the bar so as to maintain an intermediate portion of the bar substantially in a horizontal plane during general lengthwise movement of the bar.

Other objects and features of the invention will become apparent as the description proceeds, especially when taken in conjunction with the accompanying drawings, illustrating preferred embodiments of the invention, wherein:

The figure is a diagrammatic side elevation of the linkage for supporting the seat.

Referring now to the drawing there is provided a seat support bar 10. It will be understood that in an automobile a pair of these bars are provided adjacent the ends of each seat frame. The bars 10 extend crossways of the seat and thus fore and aft of the vehicle.

Adapted to be fixedly mounted to the floor of the vehicle are stationary or fixed bars 12, one of which is seen in the figure. It may be assumed in the drawing that the lefthand end of the bar 10 corresponds to the front edge of the seat. An extensible link 14 is provided which has a pivot connection indicated at 16 to the forward end of the seat support bar 10. In addition the extensible link includes a pivot connection diagrammatically indicated at 18 to a point adjacent the forward end of the stationary bar 12.

The extensible link 14 may include a screw and nut combination so that the extensible portion 20 may be moved longitudinally of a housing portion 22. Suitable mechanism for effecting this adjustment but which forms no part of the present invention is illustrated in copending application, Serial No. 726,738 filed April 7, 1958, now Patent No. 2,962,084, issued November 29, 1960.

Adjacent the opposite or rear end of the fixed bar 12 there is provided a pivot connection indicated diagrammatically at 24 to which is connected a second extensible link 26 which may be identical with the link 22 previously described. However, the upper end of the rear extensible link 26 is not pivotally connected to the rear end of the seat support bar 10. Instead, there is provided a support link 28 which at its rear end has a pivot connection indicated at 30 with the upper end of the extensible element 32 of the extensible link 26. Adjacent its rear end the seat support bar 10 is provided with a downwardly extending leg portion 34. A short suspension link 36 is provided interconnecting the leg 34 and a portion of the support link 28. The suspension link 36 has a pivot connection indicated at 38 with the support link 28 and it has a pivot connection indicated at 40 with the downwardly extending leg 34 of the seat support bar 10.

With the mechanism so far described, it will be apparent that if the seat support bar 10 is moved generally endwise or longitudinally of the vehicle its forward end and specifically the pivot connection 16 moves in an arc concentric with the pivot connection 18. From the position shown in the figure, it will thus be apparent that forward movement of the seat (to the left as seen in the figure) results in a lifting of the forward end of the seat until the point 16 passes directly above the pivot point 18. Thereafter continued forward movement of the seat results in downward movement of its forward edge. However, at this time forward movement of the seat bar 10 results in swinging of the pivot support 40 for the rear end of the seat bar in an arc concentric with the pivot connection 38. If the pivot point 38 remains stationary and no other adjustments were required the arrangement would compensate for movement of the bar and would maintain an intermediate point on the seat support bar 10 in a substantially horizontal plane.

However, the adjustment mechanism disclosed herein contemplates that the seat may be raised and lowered and selectively tilted as well as moved horizontally. It will of course be apparent that if the extensible links 14 and 26 are both extended simultaneously the seat is raised. Similarly, if the extensible links are both shortened simultaneously the seat is lowered. If either of the links is extended or shortened while the other remains stationary, the seat is selectively tilted.

Mechanism is provided for allowing for various positions of adjustment of the seat support mechanism and this mechanism comprises toggle linkage indicated generally at 42 and comprising an upper toggle link 44 and a lower toggle link 46. The upper toggle link 44 is provided with a pivot connection indicated at 48 to an intermediate point of the seat support bar 10. The toggle links 44 and 46 are connected together by a pivot connection 50. The other end of the toggle link 46 is pivoted as indicated at 52 to a fixed support 54 carried by the lower stationary support bar 12.

The elongated support bar or link 28 has a pivot connection 56 to an intermediate point on the toggle link 44. Accordingly, as the toggle is moved as a result of vertical movement of the seat support bar 10, or as a result of horizontal movement of the seat support bar 10, or both, the support bar or link 28 is moved in a compensating manner to shift the pivot connection 38 of the suspension link 36 in a desired manner. The mechanism for effecting fore and aft adjustment of the seat comprises an extensible link 58, the forward end of which has a pivot connection diagrammatically indicated at 60 with a stationary bracket 62 carried by the fixed or stationary bar 12. The opposite end of the extensible link 58 has a pivot connection 64 with a bracket 66 fixed to and depending from the seat support bar 10.

Thus, when it is desired to shift the seat forwardly from the position shown in the figure, the extensible link 58 is shortened, thus applying a force to the bracket 66 tending to move the seat support bar 10 to the left. At this time, movement of the bar to the left causes its pivot connection 16 to move in an upwardly convex arc concentric with the pivot support 18 of the front extensible link 22. At the same time and assuming for the moment that the support or link 28 is stationary, such movement forward of the seat support bar 10 results in a movement of the pivot connection 40 at the rear end of the bar in an upwardly concave arc which is concentric with the pivot connection 38. Thus, as the pivot connection 16 at the front of the bar 10 causes the front of the bar to elevate, the pivot connection 40 at the rear end of the bar causes the rear end of the bar to move downwardly. The linkage is designed so that these motions substantially counterbalance each other and an intermediate portion of the seat moves substantially horizontally forward.

It will of course be apparent that as the extensible links 22 and 26 are extended, the arcs in which the opposite ends of the seat support bar 10 move are substantially flattened. As the extensible links are extended, however, so also is the toggle device 42 resulting in a rearward movement of the support bar or link 28. This in turn results in a shifting of the pivot point 38 and the parts are constructed and arranged so that compensation automatically takes place.

It will be observed that generally endwise movement of the bar 10 to the left as seen in the figure will cause counterclockwise swinging movement of the link 44. Since the support bar 28 is connected at 56 to an intermediate point on the link 44, the support bar 28 will move generally to the left but at a slower rate or in a lesser amount as compared to movement of the bar 10. This movement of the support bar 28 to the left causes its pivot connection 30 to the link 26 to swing in an upwardly convex arc. At the same time the pivot connection 38 to the suspension link 36 shifts to the left in an upwardly convex arc. However, since the bar 10 is moving more rapidly to the left than the support bar 28, the right hand end of the bar 10 swings in an upwardly concave arc about the pivot connection 38, due to the presence of the suspension link 36. By a proper selection of the lengths of links and the location of pivots, an intermediate point on the seat support bar 10 may be caused to move substantially horizontally or in a relatively straight line, rather than in an upwardly convex arc of relatively short radius as would be the case if both links 22 and 26 were connected directly to the seat support bar 10.

With the mechanism as described, it will be apparent that the driver of the vehicle may adjust the seat to a desired height which places his eyes at the correct position. Thereafter, the seat may be moved fore and aft as required without changing the level of the driver's eyes and thus without changing his vision of the road.

The drawing and the foregoing specification constitute a description of the improved adjustable seat support mechanism in such full, clear, concise and exact terms as to enable any person skilled in the art to practice the invention, the scope of which is indicated by the appended claims.

What I claim as my invention is:

1. An adjustable vehicle seat suspension comprising a seat support bar adapted to be connected to one end of a vehicle seat, a first adjusting link pivotally connected at one end to one end of said bar and pivotally connected at its other end to a fixed pivot mounting located generally below the pivot connection between said link and bar so that as said bar is moved endwise, said pivot connection moves in an arc concentric with said pivot mounting, a second adjusting link located adjacent the opposite end of said bar and pivotally connected at its lower end to a fixed pivot mounting, compensating linkage connecting said second adjusting link and the said other end of said bar and operable during generally endwise adjustment of said bar to maintain the center of said bar at a substantially uniform height and means for shifting said bar endwise into different positions of adjustment.

2. A suspension as defined in claim 1 in which said adjusting links are extensible.

3. A suspension as defined in claim 1 in which said compensating linkage comprises a pair of toggle links connected between an intermediate point on said bar and a fixed pivot mounting therebelow, a support bar pivotally connected at one end to an intermediate point on one of said toggle links and at its other end to the upper end of said second adjusting link, and a lift link pivotally connecting the said other end of said bar to said support link.

4. A suspension as defined in claim 1 in which said compensating linkage comprises a pair of toggle links connected between an intermediate point on said bar and a fixed pivot mounting therebelow, a support bar pivotally connected at one end to an intermediate point on one of said toggle links and at its other end to the upper end of said second adjusting link, and a lift link pivotally connecting the said other end of said bar to a point on said support link intermediate the ends thereof.

5. An adjustable vehicle seat suspension comprising a seat support bar adapted to be connected to one end of a vehicle seat, a fixed bar generally parallel to and below said seat support bar, a first extensible link pivotally connected adjacent ends of said bars, a second extensible link pivotally connected at one end to the other end of said fixed bar, and compensating linkage connecting the other end of said second extensible link and the other end of said seat support bar to tilt said bar so that as said seat support bar moves generally endwise, one end thereof moves in an upwardly convex arc and the other end thereof moves in an upwardly concave arc.

6. An adjustable vehicle seat suspension comprising a seat support bar adapted to be connected to one end of a vehicle seat, means mounting said bar for generally endwise movement, said means comprising first linkage means pivotally connected to one end of said bar and having a pivot mounting below its pivotal connection to said bar to cause the front end of said bar to move in an upwardly convex arc on endwise movement of said bar, a suspension link pivotally connected at one end to the other end of said bar and having a pivot mounting above its pivotal connection to said bar to cause the rear end of said bar to move in an upwardly concave arc on endwise movement of said bar, and means for shifting said bar endwise into different positions of adjustment.

7. An adjustable vehicle seat suspension comprising a base, a seat support bar adapted to be connected to one end of a vehicle seat, means mounting said bar for generally endwise movement, said means comprising a first exensible linkage means connecting said base and bar pivotally connected to one end of said bar and having a pivot mounting below its pivotal connection to said bar, suspension linkage means connecting said base and bar pivotally connected at one end to the other end of said bar and having a pivot mounting above its pivotal connection to said bar and extensible means connected between said base and bar to shift said bar generally endwise.

8. An adjustable vehicle seat suspension comprising a seat support bar adapted to be connected to one end of a vehicle seat, means mounting said bar for generally endwise movement, said means comprising a first extensible link pivotally connected to one end of said bar and having a pivot mounting below its pivotal connection to said bar, and a suspension link pivotally connected at one end to the other end of said bar and having a pivot mounting above its pivotal connection to said bar, a second extensible link connected at one end to a fixed pivot mounting adjacent to and below the other end of said seat support bar and linkage interconnecting said second extensible link and said suspension link.

9. An adjustable vehicle seat suspension comprising a seat support bar adapted to be connected to one end of a vehicle seat, means mounting said bar for generally endwise movement, said means comprising a first extensible link pivotally connected to one end of said bar and having a pivot mounting below its pivotal connection to said bar, and a suspension link pivotally connected at one end to the other end of said bar and having a pivot mounting above its pivotal connection to said bar, toggle linkage connecting an intermediate point on said bar and a fixed mounting thereabeneath, a second extensible link having a fixed pivot mounting for one end thereof adjacent the other end of said bar, a support link pivoted at its ends between said toggle linkage and the other end of said second extensible link, said suspension link being pivotally connected between said support link and the said other end of said bar.

10. An adjustable vehicle seat suspension comprising a seat support bar adapted to be connected to one end of a vehicle seat, means mounting said bar for generally endwise movement, said means comprising a first extensible link pivotally connected to one end of said bar and having a pivot mounting below its pivotal connection to said bar, and a suspension link pivotally connected at one end to the other end of said bar and having a pivot mounting above its pivotal connection to said bar, and support linkage for said suspension link including a member pivotally connected to the aforesaid pivot mounting of said suspension link, and means connecting said member and bar to move said member generally fore and aft of the vehicle upon similar movement of the seat but in a lesser amount.

11. An adjustable vehicle seat suspension comprising a seat support bar adapted to be connected to one end of a vehicle seat and to extend generally fore and aft of the vehicle, means mounting said bar for generally endwise movement fore and aft of the vehicle, said means comprising a rigid support link extending generally vertically in an intermediate position of adjustment and pivotally connected at its upper end to said bar adjacent one end of said bar and pivotally connected at its lower end to a fixed pivot mounting so that as said bar is moved fore and aft, the end of said bar adjacent said support link is caused to swing in an upwardly convex arc concentric with said fixed pivot mounting, a suspension link adjacent the other end of said bar and extending generally vertically in an intermediate position of adjustment, said suspension link being pivotally connected at its lower end to said bar adjacent the other end of said bar, pivot support means connected to the upper end of said suspension link so that as said bar is moved fore and aft the end of said bar connected to said suspension link is caused to swing in an upwardly concave curved path, and positioning means connected to said bar and effective to maintain said bar in different positions of adjustment.

References Cited in the file of this patent

UNITED STATES PATENTS

| | | |
|---|---|---|
| 1,664,129 | Pallenberg | Mar. 27, 1928 |
| 2,615,499 | Wallace | Oct. 28, 1952 |
| 2,707,137 | Hollstein | Apr. 26, 1955 |